United States Patent
Chang et al.

(10) Patent No.: US 10,491,878 B1
(45) Date of Patent: Nov. 26, 2019

(54) IMAGE SYNTHESIZING METHOD AND SYSTEM

(71) Applicant: Wistron Corporation, New Taipei (TW)

(72) Inventors: Yao-Tsung Chang, New Taipei (TW); Chia Ling Hsu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/102,708

(22) Filed: Aug. 13, 2018

(30) Foreign Application Priority Data

Jul. 2, 2018 (TW) .............................. 107122842 A

(51) Int. Cl.
*H04N 13/00* (2018.01)
*H04N 13/128* (2018.01)
*H04N 13/122* (2018.01)

(52) U.S. Cl.
CPC ......... *H04N 13/128* (2018.05); *H04N 13/122* (2018.05); *H04N 2013/0081* (2013.01)

(58) Field of Classification Search
CPC ............... H04N 13/128; H04N 13/122; H04N 2013/0081
See application file for complete search history.

(56) References Cited

U.S. PATENT DOCUMENTS

| | | | | |
|---|---|---|---|---|
| 2012/0092462 | A1* | 4/2012 | Li | G02B 27/2221 348/49 |
| 2012/0301044 | A1* | 11/2012 | Nakada | H04N 5/2258 382/255 |
| 2012/0307009 | A1* | 12/2012 | Li | H04N 5/23229 348/46 |
| 2013/0107002 | A1* | 5/2013 | Kikuchi | H04N 5/232 348/46 |
| 2016/0300337 | A1* | 10/2016 | Hsieh | G06T 5/50 |

FOREIGN PATENT DOCUMENTS

TW          201248549 A      12/2012

* cited by examiner

*Primary Examiner* — Zhihan Zhou
(74) *Attorney, Agent, or Firm* — Donald E. Stout; Stout, Uxa & Buyan, LLP

(57) ABSTRACT

An image synthesizing method and system include capturing a first image using a first aperture, which corresponds to a first depth of field (DOF); capturing a second image using a second aperture, which corresponds to a second DOF and is different from the first aperture; and receiving the first image and the second image, on which an image processing is performed to obtain a synthesized image, which has a DOF being between the first DOF and the second DOF.

8 Claims, 4 Drawing Sheets

$Pij = W1 \times P1ij + W2 \times P2ij$

IMAGE SYNTHESIZING METHOD AND SYSTEM

CROSS-REFERENCE TO RELATED APPLICATIONS

This application claims priority of Taiwan Patent Application No. 107122842, filed on Jul. 2, 2018, the entire contents of which are herein expressly incorporated by reference.

BACKGROUND OF THE INVENTION

1. Field of the Invention

The present invention generally relates to an image processing, and more particularly to an image synthesizing system and method.

2. Description of Related Art

The depth of field (DOF) is the range where objects appear clear in an image captured by a camera, and the objects out of the range become blur. The DOF may be determined by adjusting an aperture. N(aperture value)=f (focal length)/D(aperture diameter) or D=f/N, where the aperture value N may commonly be 1, 1.4, 2, 2.8, 4, 5.6, 8, 11, etc. The DOF may be increased by reducing the aperture size (or increasing the aperture value). Alternatively, the DOF may be decreased by increasing the aperture size (or decreasing the aperture value). For example, the aperture size corresponding to an aperture value 4 is smaller than the aperture size corresponding to an aperture value 2, but the former has a DOF deeper than the latter.

A small aperture is commonly used to obtain deep DOF when capturing distant scenes. On the contrary, a large aperture is commonly used to obtain shallow DOF when capturing near objects. A user needs to adjust the aperture constantly to achieve an expected effect, therefore causing the user inconvenience. Shallow DOF effect may be made through post-production by using software, but is commonly not real enough.

A need has thus arisen to propose a novel mechanism to overcome drawbacks in conventional image capturing.

SUMMARY OF THE INVENTION

In view of the foregoing, it is an object of the embodiment of the present invention to provide an image synthesizing system and method for realizing different depths of field.

According to one embodiment of an image synthesizing method, an aperture of an image capture device is set to a first aperture, which corresponds to a first depth of field (DOF), and a first image is captured by using the first aperture. The aperture of the image capture device is set to a second aperture, which corresponds to a second DOF and is different from the first aperture, and a second image is captured by using the second aperture. The first image and the second image are received, and an image processing is performed on the received images to obtain a synthesized image, which has a DOF being between the first DOF and the second DOF.

According to another embodiment of an image synthesizing method, a first image is captured by a first image capture device with a first aperture, which corresponds to a first depth of field (DOF); and a second image is captured by a second image capture device with a second aperture, which corresponds to a second DOF, the first aperture being different from the second aperture. The first image and the second image are received, and an image processing is performed on the received images to obtain a synthesized image, which has a DOF being between the first DOF and the second DOF.

DETAILED DESCRIPTION OF THE INVENTION

Figure 1A:
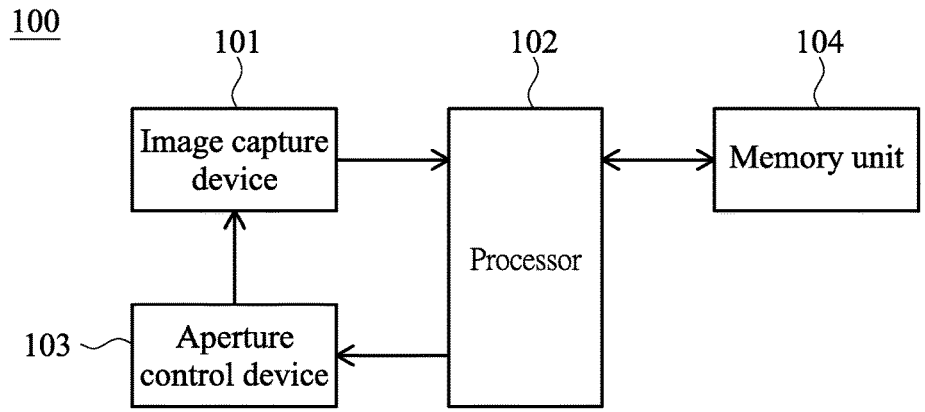
FIG. 1A shows a block diagram illustrating an image synthesizing system according to a first embodiment of the present invention.
Figure 1B:
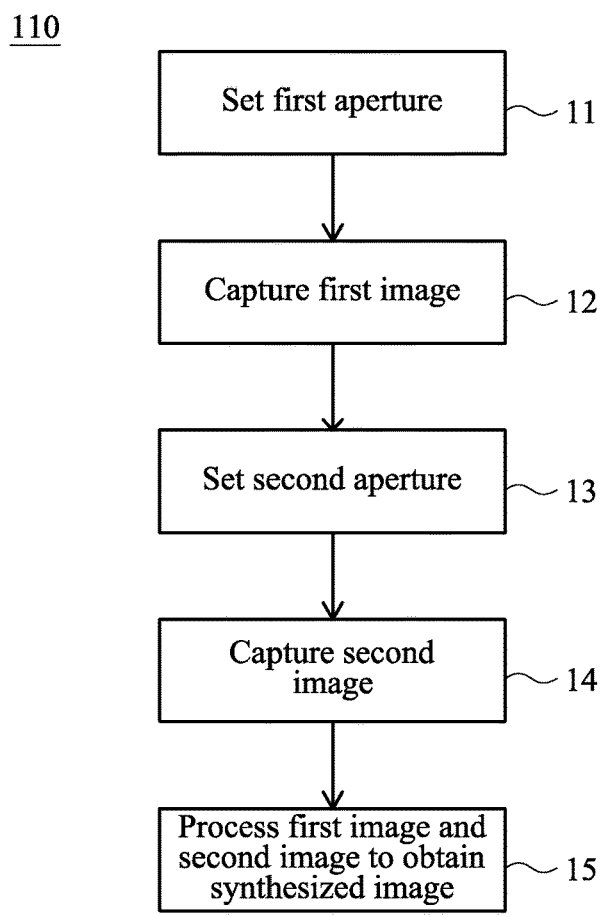
FIG. 1B shows a flow diagram illustrating an image synthesizing method according to the first embodiment of the present invention.

FIG. 1A shows a block diagram illustrating an image synthesizing system 100 according to a first embodiment of the present invention, and FIG. 1B shows a flow diagram illustrating an image synthesizing method 110 according to the first embodiment of the present invention. The image synthesizing system 100 may include an image capture device 101, a processor 102, an aperture control device 103 and a memory unit 104. The image capture device 101 may include a two-dimensional (2D) camera with a variable aperture for capturing a 2D image. In one example, the image capture device 101 may be disposed in a mobile device (e.g., mobile phone). The image capture device 101 may also include a shutter, a flash and/or exposure compensation mechanism for capturing a clear image. The processor 102 may execute a control program to adjust a size of the aperture of the image capture device 101 through the aperture control device 103. Moreover, the processor 102 may receive images captured by the image capture device 101 and may then perform an image processing on the received images. The memory unit 104, such as dynamic random-access memory (DRAM) or static random-access memory (SRAM), may store images captured by the image capture device 101, control programs executable by the processor 102 and images processed by the processor 102.

In the embodiment, in step 11, the processor 102 sets the aperture of the image capture device 101, through the aperture control device 103, to a first aperture, which corresponds to a first depth of field (DOF). Next, in step 12, the image capture device 101 captures a first image by using the first aperture. In step 13, the processor 102 sets the aperture of the image capture device 101, through the aperture control device 103, to a second aperture, which corresponds to a second DOF. Subsequently, in step 14, the image capture device 101 captures a second image by using the second aperture. In the embodiment, the first aperture is different from the second aperture. Accordingly, the first DOF is different from the second DOF. For example, the first aperture is larger than the second aperture, and the first DOF is shallower than the second DOF.

Figure 1C:
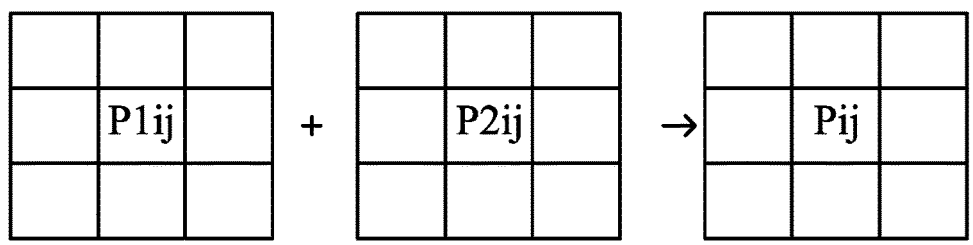
FIG. 1C shows a schematic diagram that illustrates performing an interpolation operation on pixels of the first image and corresponding pixels of the second image to obtain a synthesized image.

In step 15, the processor 102 may receive the first image and the second image, on which an image processing is performed to obtain a synthesized image. According to one aspect of the embodiment, the synthesized image has a DOF being between the first DOF and the second DOF. In the embodiment, the processor 102 may obtain the synthesized image by performing an interpolation operation (e.g., weighted sum) on pixels of the first image and corresponding pixels of the second image. FIG. 1C shows a schematic diagram that illustrates performing an interpolation operation on pixels of the first image and corresponding pixels of the second image to obtain a synthesized image, where P1ij, P2ij and Pij represent corresponding pixels of the first image, the second image and the synthesized image respectively, and W1 and W2 represent weights for the first image and the second image respectively. In one example, W1 and W2 have values between 1 and 0, and a sum of W1 and W2 is equal or less than 1.

In one embodiment, an aperture priority mode is adopted. In this mode, if the first aperture is larger than the second aperture, a shutter speed corresponding to the first aperture is higher than a shutter speed corresponding to the second aperture, and/or an International Organization for Standardization (ISO) value corresponding to the first aperture is lower than an ISO value corresponding to the second aperture. In another embodiment, an aperture fixed mode is adopted. In this mode, shutter speeds corresponding to the first aperture and the second aperture are the same, although the first aperture is different from the second aperture.

Figure 2A:
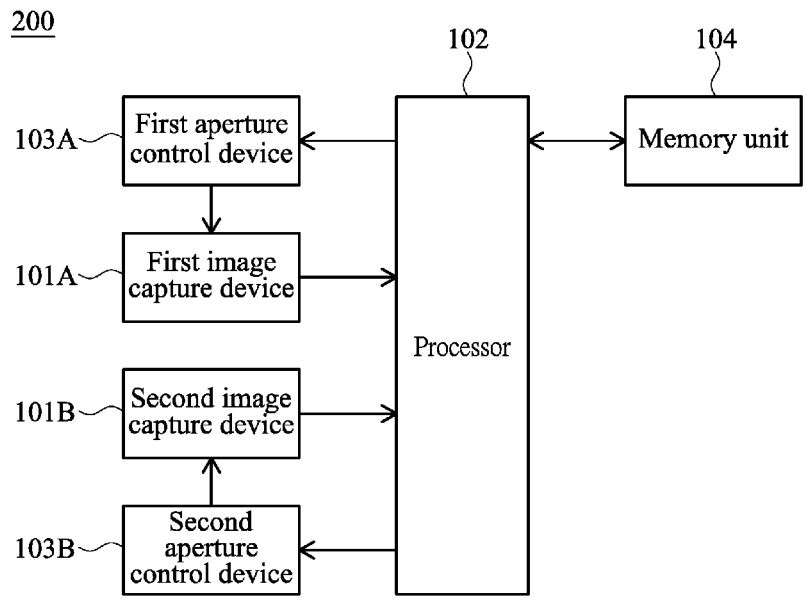
FIG. 2A shows a block diagram illustrating an image synthesizing system according to a second embodiment of the present invention.
Figure 2B:
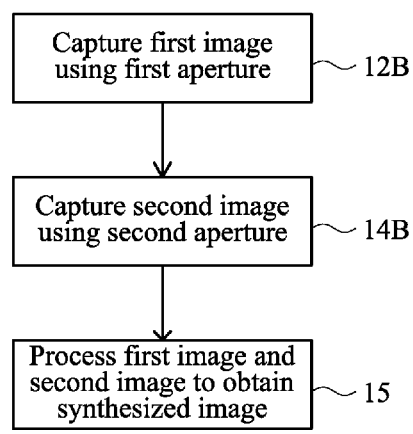
FIG. 2B shows a flow diagram illustrating an image synthesizing method according to the second embodiment of the present invention.

FIG. 2A shows a block diagram illustrating an image synthesizing system 200 according to a second embodiment of the present invention, and FIG. 2B shows a flow diagram illustrating an image synthesizing method 210 according to the second embodiment of the present invention. The image synthesizing system 200 may include a first image capture device 101A, a second image capture device 101B, a processor 102, a first aperture control device 103A, a second aperture control device 103B and a memory unit 104. The first image capture device 101A may include a 2D camera for capturing a first image. The second image capture device 101B may include a 2D camera for capturing a second image. In one example, the first image capture device 101A and the second image capture device 101B may be disposed in a mobile device (e.g., mobile phone). The first image capture device 101A or the second image capture device 101B may also include a shutter, a flash and/or exposure compensation mechanism for capturing a clear image. The processor 102 may execute a control program to adjust a size of the aperture of the first image capture device 101A and a size of the aperture of the second image capture device 101B through the first aperture control device 103A and the second aperture control device 103B, respectively. Moreover, the processor 102 may receive the first image captured by the first image capture device 101A and the second image captured by the second image capture device 101B, and may then perform an image processing on the received images. The memory unit 104, such as dynamic random-access memory (DRAM) or static random-access memory (SRAM), may store the first image captured by the first image capture device 101A and the second image captured by the second image capture device 101B, control programs executable by the processor 102 and images processed by the processor 102.

In one example, the first image capture device 101A has a fixed first aperture, and the second image capture device 101B has a fixed second aperture, which is different from the first aperture. Accordingly, the image synthesizing system 200 may omit the first aperture control device 103A and the second aperture control device 103B.

In the embodiment, in step 12B, the first image capture device 101A captures a first image by using the first aperture, which corresponds to a first DOF. The first aperture may be set by the processor 102 through the first aperture control device 103A, or may be fixed. In step 14B, the second image capture device 101B captures a second image by using the second aperture, which corresponds to a second DOF. The second aperture may be set by the processor 102 through the second aperture control device 103B, or may be fixed. In the embodiment, the first aperture is different from the second aperture. Accordingly, the first DOF is different from the second DOF. For example, the first aperture is larger than the second aperture, and the first DOF is shallower than the second DOF. In the embodiment, step 12B and step 14B may be performed at the same time.

In step 15, the processor 102 may receive the first image and the second image, on which an image processing is performed to obtain a synthesized image. According to one aspect of the embodiment, the synthesized image has a DOF being between the first DOF and the second DOF. In the embodiment, the processor 102 may obtain the synthesized image by performing an interpolation operation (e.g., weighted sum) on pixels of the first image and corresponding pixels of the second image, as exemplified in FIG. 1C.

In step 15 of the first embodiment and the second embodiment, as shown in FIG. 1C, P1ij, P2ij and Pij represent corresponding pixels of the first image, the second image and the synthesized image respectively, W1 and W2 represent weights for the first image and the second image respectively, and a pixel Pij of the synthesized image may be expressed as follows:

$$Pij = W1 \times P1ij + W2 \times P2ij$$

If a first aperture diameter Da=f/Na, a second aperture diameter Db=f/Nb, an aperture diameter D corresponding to the synthesized image (or expected by a user) is f/N, where Da, Db and D are aperture diameters, Na, Nb and N are aperture values, and weights W1 and W2 may be obtained according to the following methods.

Figure 3A:
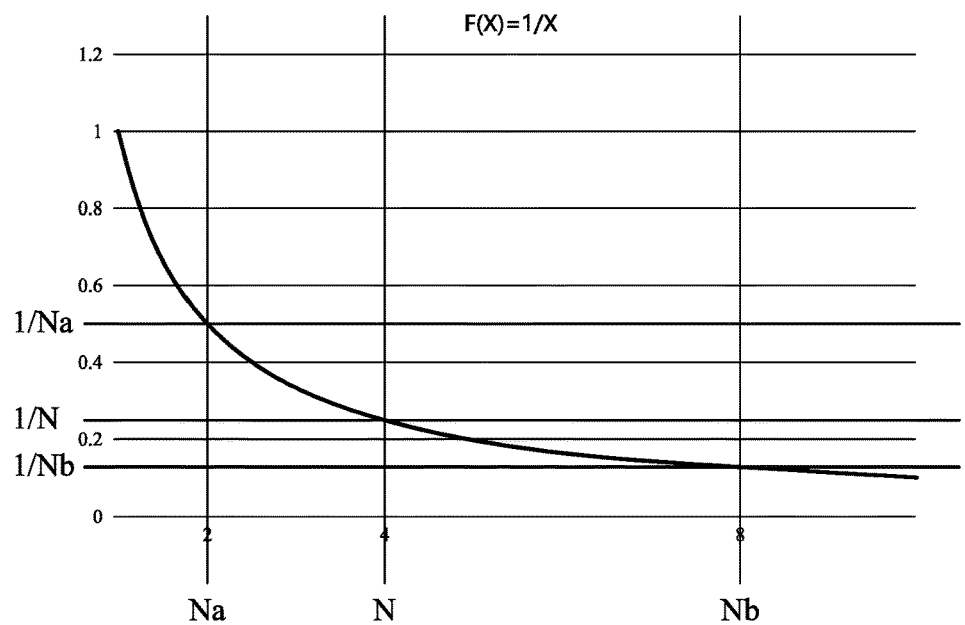
FIG. 3A exemplifies a relationship between an aperture value N and 1/N.

According to one specific embodiment, for an aperture value N, 1/N represents a size of the aperture, which becomes smaller when N is increasing. The weights W1 and W2 may be determined by interpolating a reciprocal for N, and a relationship between an aperture value N and 1/N is exemplified in FIG. 3A:

$$W1 = (1/N - 1/Nb)/(1/Na - 1/Nb)$$

$$W2 = (1/Na - 1/N)/(1/Na - 1/Nb)$$

$$Pij = W1 \times P1ij + W2 \times P2ij$$

According to another specific embodiment, as a size of the aperture is proportional to $(1/D)^2$, initial weights w1 and w2 are determined by interpolating a reciprocal for N, and the initial weights w1 and w2 are then squared to obtain weight W1 and W2:

$$w1 = (1/N - 1/Nb)/(1/Na - 1/Nb)$$

$$w2=(1/Na-1/N)/(1/Na-1/Nb)$$

$$Pij=w1^2\times P1ij+w2^2\times P2ij$$

$$=W1\times P1ij+W2\times P2ij$$

Figure 3B:
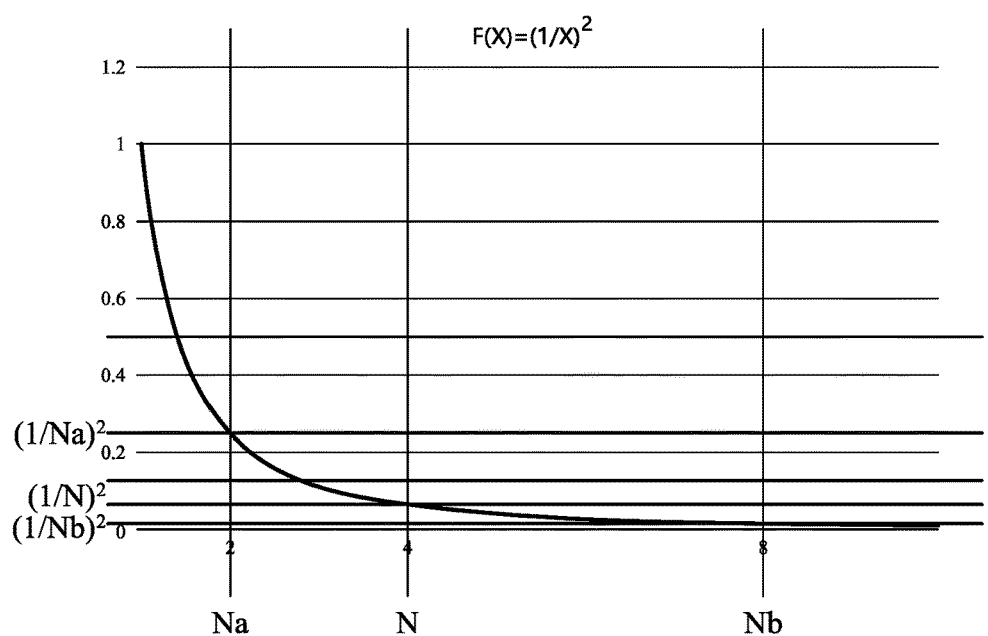
FIG. 3B exemplifies a relationship between an aperture diameter D and $(1/D)^2$.

In a further specific embodiment, as incoming light through an aperture is proportional to $(1/D)^2$, weights W1 and W2 may be determined by interpolating a reciprocal for $D^2$, and a relationship between an aperture diameter D and $(1/D)^2$ is exemplified in FIG. 3B:

$$W1=(1/N^2-1/Nb^2)/(1/Na^2-1/Nb^2)$$

$$W2=(1/Na^2-1/N^2)/(1/Na^2-1/Nb^2)$$

$$Pij=W1\times P1ij+W2\times P2ij$$

Although specific embodiments have been illustrated and described, it will be appreciated by those skilled in the art that various modifications may be made without departing from the scope of the present invention, which is intended to be limited solely by the appended claims.

What is claimed is:

1. An image synthesizing method, comprising:
setting an aperture of an image capture device to a first aperture, which corresponds to a first depth of field (DOF);
capturing a first image by using the first aperture;
setting the aperture of the image capture device to a second aperture, which corresponds to a second DOF and is different from the first aperture;
capturing a second image by using the second aperture; and
receiving the first image and the second image, on which an image processing is performed to obtain a synthesized image, which has a DOF being between the first DOF and the second DOF;
wherein the image processing comprises a step of performing an interpolation operation on corresponding pixels of the first image and the second image;
wherein a pixel Pij of the synthesized image is expressed as follows:

$$Pij=W1\times P1ij+W2\times P2ij$$

where P1$ij$ and P2$ij$ represent the corresponding pixels of the first image and the second image respectively, and W1 and W2 represent weights for the first image and the second image respectively;
wherein the weights W1 and W2 are expressed as follows:

$$W1=(1/N-1/Nb)/(1/Na-1/Nb)$$

$$W2=(1/Na-1/N)/(1/Na-1/Nb)$$

where 1/Na represents the first aperture, 1/Nb represents the second aperture, and 1/N represent an aperture of the synthesized image.

2. The method of claim 1, wherein the weights W1 and W2 have values between 1 and 0, and a sum of the weights W1 and W2 is equal or less than 1.

3. An image synthesizing method, comprising:
setting an aperture of an image capture device to a first aperture, which corresponds to a first depth of field (DOF);
capturing a first image by using the first aperture;
setting the aperture of the image capture device to a second aperture, which corresponds to a second DOF and is different from the first aperture;
capturing a second image by using the second aperture; and
receiving the first image and the second image, on which an image processing is performed to obtain a synthesized image, which has a DOF being between the first DOF and the second DOF;
wherein the image processing comprises a step of performing an interpolation operation on corresponding pixels of the first image and the second image;
wherein a pixel Pij of the synthesized image is expressed as follows:

$$Pij=W1\times P1ij+W2\times P2ij$$

where P1$ij$ and P2$ij$ represent the corresponding pixels of the first image and the second image respectively, and W1 and W2 represent weights for the first image and the second image respectively;
wherein the weights W1 and W2 are expressed as follows:

$$W1=(1/N^2-1/Nb^2)/(1/Na^2-1/Nb^2)$$

$$W2=(1/Na^2-1/N^2)/(1/Na^2-1/Nb^2)$$

where 1/Na represents the first aperture, 1/Nb represents the second aperture, and 1/N represent an aperture of the synthesized image.

4. An image synthesizing method, comprising:
setting an aperture of an image capture device to a first aperture, which corresponds to a first depth of field (DOF);
capturing a first image by using the first aperture;
setting the aperture of the image capture device to a second aperture, which corresponds to a second DOF and is different from the first aperture;
capturing a second image by using the second aperture; and
receiving the first image and the second image, on which an image processing is performed to obtain a synthesized image, which has a DOF being between the first DOF and the second DOF;
wherein the image processing comprises a step of performing an interpolation operation on corresponding pixels of the first image and the second image;
wherein a pixel Pij of the synthesized image is expressed as follows:

$$Pij=W1\times P1ij+W2\times P2ij$$

where P1$ij$ and P2$ij$ represent the corresponding pixels of the first image and the second image respectively, and W1 and W2 represent weights for the first image and the second image respectively;
wherein a pixel Pij of the synthesized image is expressed as follows:

$$Pij=w1^2\times P1ij+w2^2\times P2ij$$

where w1 and w2 represent initial weights for the first image and the second image respectively, and are respectively expressed as follows:

$$w1=(1/N-1/Nb)/(1/Na-1/Nb)$$

$$w2=(1/Na-1/N)/(1/Na-1/Nb)$$

where 1/Na represents the first aperture, 1/Nb represents the second aperture, and 1/N represent an aperture of the synthesized image.

5. An image synthesizing method, comprising:
capturing a first image by a first image capture device with a first aperture, which corresponds to a first depth of field (DOF);

capturing a second image by a second image capture device with a second aperture, which corresponds to a second DOF, the first aperture being different from the second aperture; and receiving the first image and the second image, on which an image processing is performed to obtain a synthesized image, which has a DOF being between the first DOF and the second DOF;

wherein the image processing comprises a step of performing an interpolation operation on corresponding pixels of the first image and the second image;

wherein a pixel Pij of the synthesized image is expressed as follows:

$$Pij=W1 \times P1ij+W2 \times P2ij$$

where P1$ij$ and P2$ij$ represent the corresponding pixels of the first image and the second image respectively, and W1 and W2 represent weights for the first image and the second image respectively;

wherein the weights W1 and W2 are expressed as follows:

$$W1=(1/N-1/Nb)/(1/Na-1/Nb)$$

$$W2=(1/Na-1/N)/(1/Na-1/Nb)$$

where 1/Na represents the first aperture, 1/Nb represents the second aperture, and 1/N represent an aperture of the synthesized image.

6. The method of claim 5, wherein the weights W1 and W2 have values between 1 and 0, and a sum of the weights W1 and W2 is equal or less than 1.

7. An image synthesizing method, comprising:

capturing a first image by a first image capture device with a first aperture, which corresponds to a first depth of field (DOF);

capturing a second image by a second image capture device with a second aperture, which corresponds to a second DOF, the first aperture being different from the second aperture; and receiving the first image and the second image, on which an image processing is performed to obtain a synthesized image, which has a DOF being between the first DOF and the second DOF;

wherein the image processing comprises a step of performing an interpolation operation on corresponding pixels of the first image and the second image;

wherein a pixel Pij of the synthesized image is expressed as follows:

$$Pij=W1 \times P1ij+W2 \times P2ij$$

where P1$ij$ and P2$ij$ represent the corresponding pixels of the first image and the second image respectively, and W1 and W2 represent weights for the first image and the second image respectively;

wherein the weights W1 and W2 are expressed as follows:

$$W1=(1/N^2-1/Nb^2)/(1/Na^2-1/Nb^2)$$

$$W2=(1/Na^2-1/N^2)/(1/Na^2-1/Nb^2)$$

where 1/Na represents the first aperture, 1/Nb represents the second aperture, and 1/N represent an aperture of the synthesized image.

8. An image synthesizing method, comprising:

capturing a first image by a first image capture device with a first aperture, which corresponds to a first depth of field (DOF);

capturing a second image by a second image capture device with a second aperture, which corresponds to a second DOF, the first aperture being different from the second aperture; and receiving the first image and the second image, on which an image processing is performed to obtain a synthesized image, which has a DOF being between the first DOF and the second DOF;

wherein the image processing comprises a step of performing an interpolation operation on corresponding pixels of the first image and the second image;

wherein a pixel Pij of the synthesized image is expressed as follows:

$$Pij=W1x\ P1ij+W2x\ P2ij$$

where P1$ij$ and P2$ij$ represent the corresponding pixels of the first image and the second image respectively, and W1 and W2 represent weights for the first image and the second image respectively;

wherein a pixel Pij of the synthesized image is expressed as follows:

$$Pij=w1^2 \times P1ij+w2^2 \times P2ij$$

where w1 and w2 represent initial weights for the first image and the second image respectively, and are respectively expressed as follows:

$$w1=(1/N-1/Nb)/(1/Na-1/Nb)$$

$$w2=(1/Na-1/N)/(1/Na-1/Nb)$$

where 1/Na represents the first aperture, 1/Nb represents the second aperture, and 1/N represent an aperture of the synthesized image.

* * * * *